United States Patent
Murata

(10) Patent No.: US 8,840,516 B2
(45) Date of Patent: Sep. 23, 2014

(54) DYNAMIC DAMPER DEVICE

(75) Inventor: Kiyohito Murata, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 9 days.

(21) Appl. No.: 13/381,775

(22) PCT Filed: Nov. 4, 2010

(86) PCT No.: PCT/JP2010/069631
§ 371 (c)(1),
(2), (4) Date: Dec. 30, 2011

(87) PCT Pub. No.: WO2012/060004
PCT Pub. Date: May 10, 2012

(65) Prior Publication Data
US 2012/0190495 A1    Jul. 26, 2012

(51) Int. Cl.
*F16H 35/12* (2006.01)
*F16H 33/08* (2006.01)

(52) U.S. Cl.
USPC ........... 475/267; 475/153; 475/154; 192/222; 74/574.1

(58) Field of Classification Search
USPC ............. 477/3; 475/149, 150, 153, 154, 266, 475/267, 280, 59; 192/222; 74/574.1, 331
See application file for complete search history.

(56) References Cited

U.S. PATENT DOCUMENTS

| | | | |
|---|---|---|---|
| 5,285,111 A * | 2/1994 | Sherman | 475/276 |
| 6,099,428 A * | 8/2000 | Kashiwase | 475/59 |
| 6,763,743 B2 | 7/2004 | Watanabe et al. | |
| 7,110,867 B2 * | 9/2006 | Imazu | 475/5 |
| 7,727,112 B2 * | 6/2010 | Kakinami et al. | 477/79 |
| 7,988,579 B2 * | 8/2011 | Tabata et al. | 475/5 |
| 8,187,151 B2 * | 5/2012 | Gloge | 477/159 |
| 8,287,427 B2 * | 10/2012 | Sah et al. | 477/3 |
| 2003/0183467 A1 | 10/2003 | Kozarekar | |
| 2010/0227735 A1 | 9/2010 | Sah et al. | |

FOREIGN PATENT DOCUMENTS

| | | |
|---|---|---|
| DE | 10 2005 021 575 A1 | 12/2005 |
| JP | 63 110740 | 7/1988 |
| JP | 2002 340092 | 11/2002 |
| JP | 2003 314614 | 11/2003 |
| JP | 2005 69240 | 3/2005 |
| JP | 2010 1905 | 1/2010 |
| JP | 2010 164125 | 7/2010 |
| JP | 2011 226494 | 11/2011 |

* cited by examiner

*Primary Examiner* — Jacob S Scott
(74) *Attorney, Agent, or Firm* — Oblon, Spivak, McClelland, Maier & Neustadt, L.L.P.

(57) ABSTRACT

A dynamic damper device includes a planetary gear mechanism including plural differentially rotatable rotating elements, an elastic member that couples a rotating shaft rotated by being transmitted with a power with a first rotating element of the planetary gear mechanism, speed control devices that are coupled with second rotating elements different from the first rotating element and control rotation speeds of the second rotating elements, and a torque control device that is coupled with the first rotating element and controls torque acting on the first rotating element. Accordingly, the dynamic damper device achieves an effect that vibration can be appropriately reduced.

20 Claims, 6 Drawing Sheets

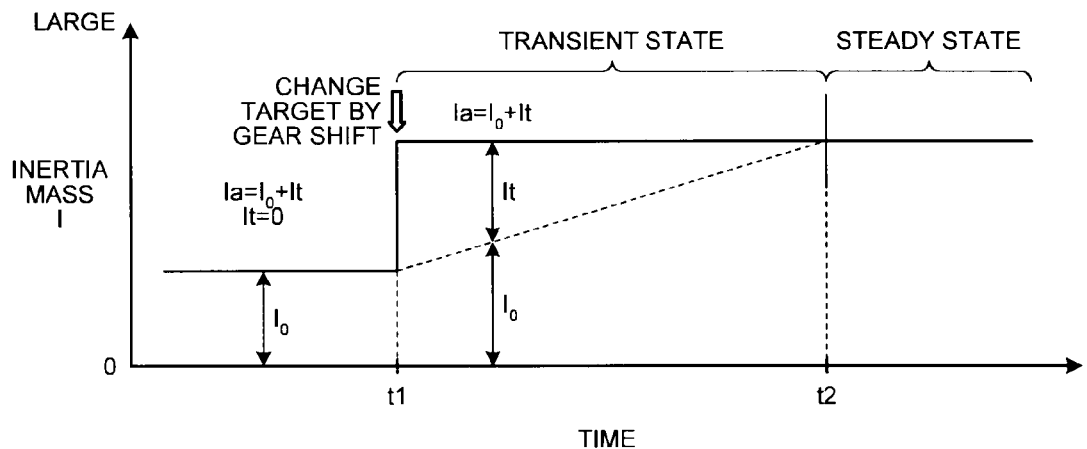

DYNAMIC DAMPER DEVICE

FIELD

The present invention relates to a dynamic damper device.

BACKGROUND

As a conventional dynamic damper device, for example, Patent Literature 1 discloses a mass dynamic damper device for hybrid vehicle which controls a resonant point by adjusting an apparent inertia mass by controlling torque of an electric motor by controlling a drive of the electric motor to thereby reduce a resonant vibration.

CITATION LIST

Patent Literature

Patent Literature 1: Japanese Patent Application Laid-open No. 2003-314614

SUMMARY

Technical Problem

Incidentally, the mass dynamic damper device for hybrid vehicle described in Patent Literature 1 as described above has a room of further improvement in such as efficiency to adjust the apparent inertia mass, for example.

An object of the present invention, which was made in view of the above circumstances, is to provide a dynamic damper device capable of appropriately reducing vibration.

Solution to Problem

In order to achieve the above mentioned object, a dynamic damper device according to the present invention includes a planetary gear mechanism including a plurality of differentially rotatable rotating elements; an elastic member that couples a rotating shaft rotated by being transmitted with a power with a first rotating element of the planetary gear mechanism; speed control devices that are coupled with second rotating elements different from the first rotating element and control rotation speeds of the second rotating elements; and a torque control device that is coupled with the first rotating element and controls torque acting on the first rotating element.

Further, in the dynamic damper device, it is possible to configure that a vibration damping control is executed by a speed control by the speed control device and a torque control by the torque control device.

Further, in the dynamic damper device, it is possible to configure that when a torque change of the rotating shaft is less than a predetermined change, the vibration damping control is executed by a speed control of the speed control device, and when the torque change of the rotating shaft is equal to or more than the predetermined change, the vibration damping control is executed by a torque control of the torque control device.

Further, in the dynamic damper device, it is possible to configure that when the vibration damping control is executed, the torque control is switched to the speed control via a period in which the torque control is overlapped with the speed control of the speed control device.

Further, in the dynamic damper device, it is possible to configure that the torque control device is configured to include a brake device or a rotary electric machine coupled with the first rotating element.

Further, in the dynamic damper device, it is possible to configure that the speed control devices are configured to include a brake device or a rotary electric machine coupled with the second rotating elements.

Further, in the dynamic damper device, it is possible to configure that the rotating shaft is rotated by being transmitted with a power from an internal combustion engine.

Advantageous Effects of Invention

The dynamic damper device according to the present invention achieves an effect that vibration can be appropriately reduced.

BRIEF DESCRIPTION OF DRAWINGS

FIG. 5 is a view showing an example of a control map.

FIG. 6 is a time chart showing an example of control.

DESCRIPTION OF EMBODIMENTS

Embodiments according to the present invention will be explained below in detail based on the drawings. Note that the present invention is by no means limited by the embodiments. Further, components in the embodiments include components which can be replaced by a person skilled in the art as well as is easy or include substantially the same components.

First Embodiment

Figure 1:
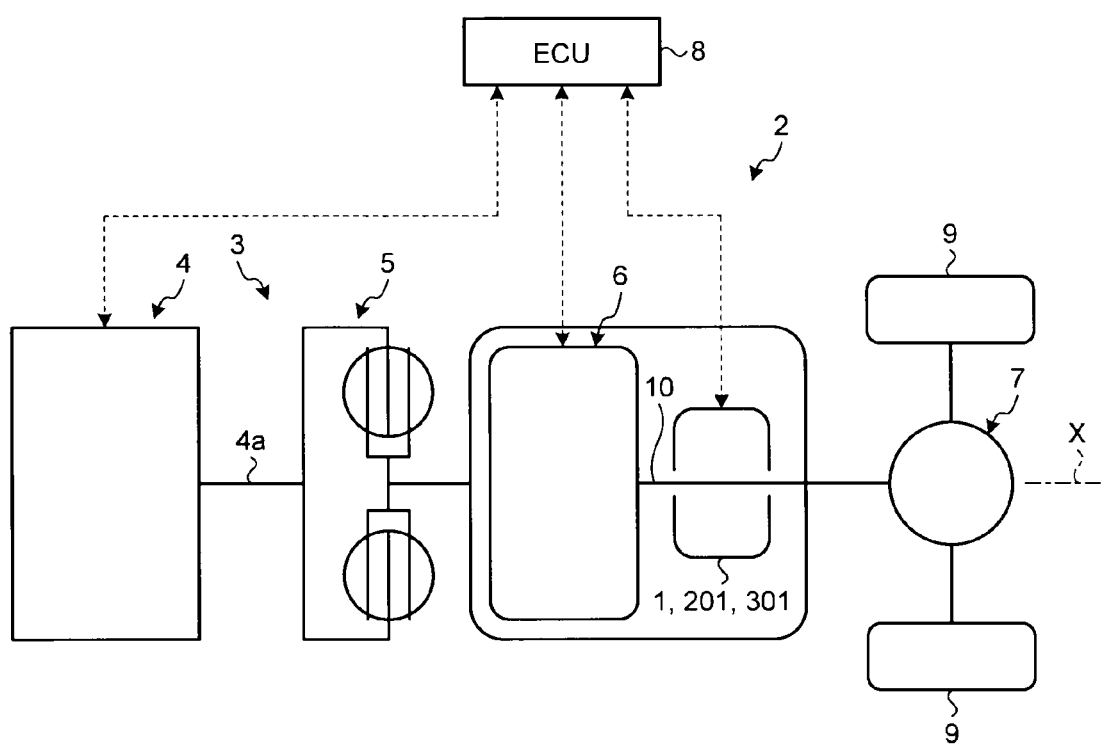
FIG. 1 is a schematic configuration view of a vehicle in which a dynamic damper device according to a first embodiment is mounted.
Figure 2:
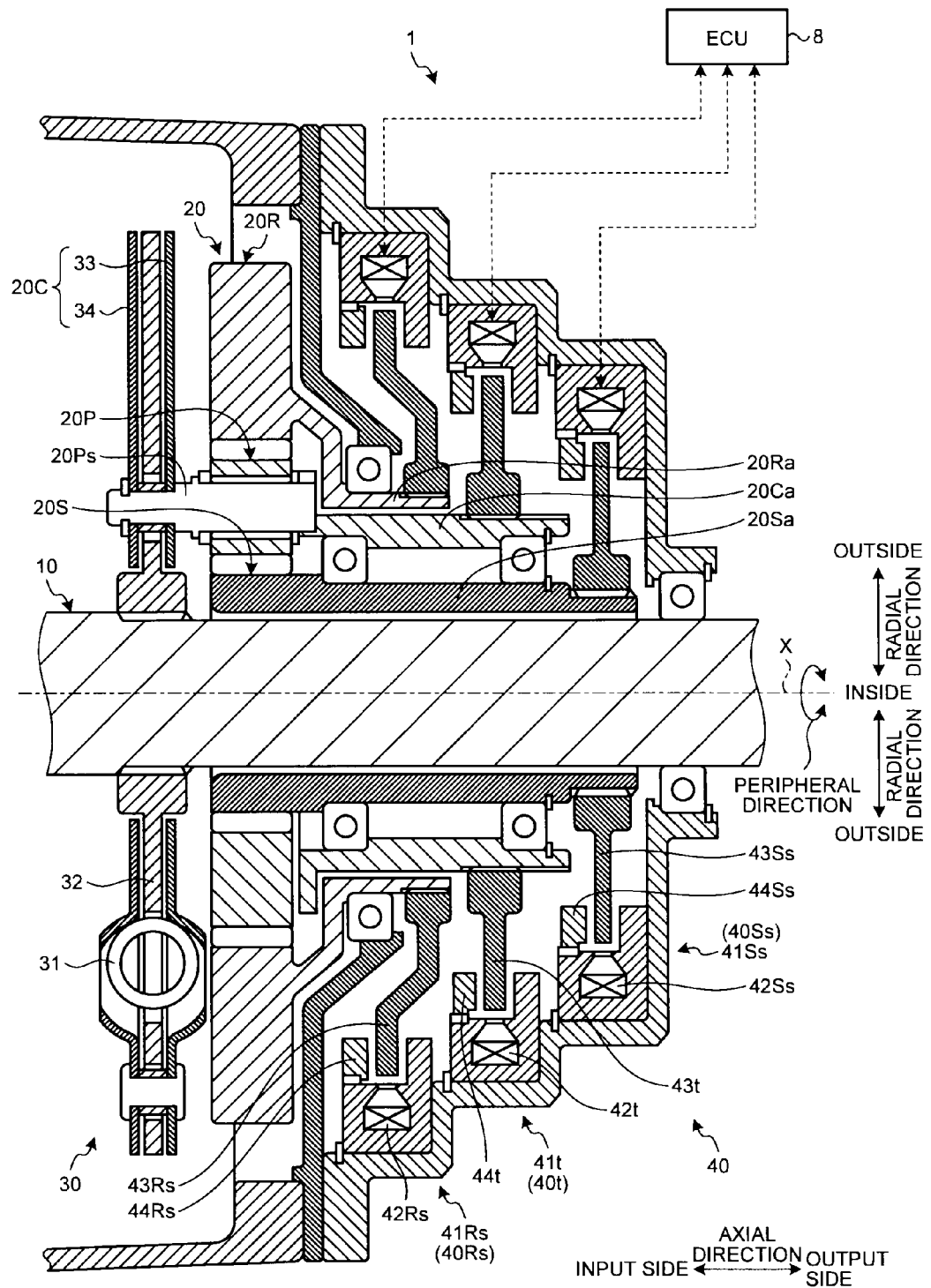
FIG. 2 is a sectional view of a main portion of the dynamic damper device.
Figure 3:
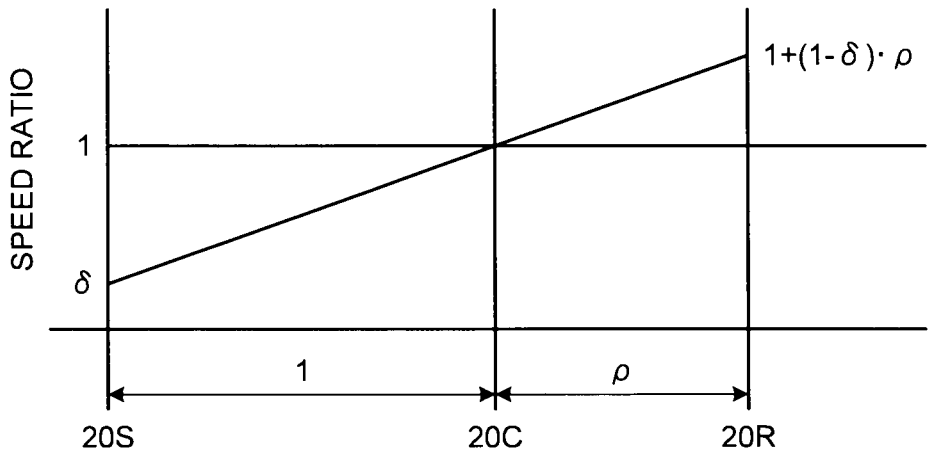
FIG. 3 is an alignment chart of a planetary gear mechanism.
Figure 4:
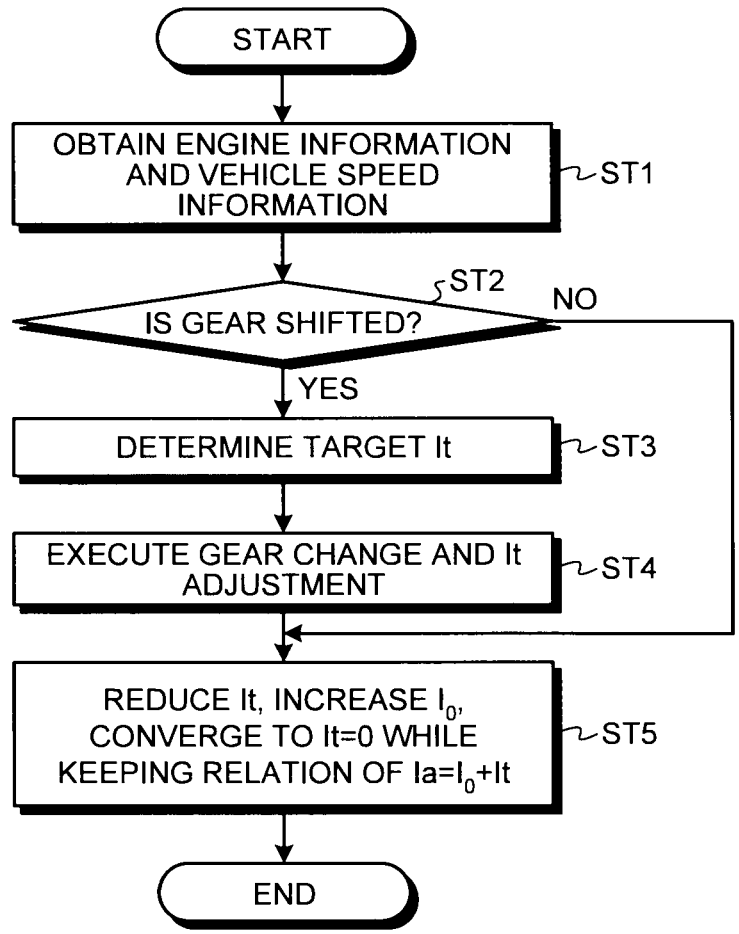
FIG. 4 is a flowchart showing an example of control by an ECU.

FIG. 1 is a schematic configuration view of a vehicle in which a dynamic damper device according to a first embodiment is mounted, FIG. 2 is a sectional view of a main portion of the dynamic damper device, FIG. 3 is an alignment chart of a planetary gear mechanism, FIG. 4 is a flowchart showing an example of control by an ECU, FIG. 5 is a view illustrating an example of a control map, and FIG. 6 is a time chart showing an example of control.

Note that, in the following explanation, unless otherwise particularly noted, a direction along a rotation axis line X of an output shaft 10 is called an axial direction, a direction orthogonal to the rotation axis line X, that is, a direction orthogonal to the axial direction is called a radial direction, and a direction about the rotation axis line X is called a circumferential direction. Further, in the radial direction, the rotation axis line X side is called a radial direction inside and an opposite side is called a radial direction outside. Further, in the axial direction, a side where a drive source is disposed (side where a power is input from the drive source) is called an input side, and an opposite side, that is, a side where drive wheels are disposed (side where a power is input to the drive wheels) is called an output side.

As illustrated in FIG. 1, a dynamic damper device 1 of the embodiment is applied to a vehicle 2 and is a so-called dynamic damper (dynamic vibration absorber) for reducing vibration using an anti-resonance principle to a resonance point (resonance frequency) of a power train 3 of the vehicle 2. The power train 3 of the vehicle 2 is configured including an engine 4 as an internal combustion engine which is a traveling drive source, a damper 5, a drive system 6 such as transmission and the like, a differential gear 7, and the like. The engine 4, the drive system 6, and the like are controlled by an ECU 8 as a control device. Accordingly, when a crank shaft 4a of the engine 4 is driven in rotation, a drive force of the engine 4 is input to and shifted by the drive system 6 via the damper 5, transmitted to respective drive wheels 9 via the differential gear 7 and the like so that the vehicle 2 can move forward or backward by that the respective drive wheels 9 rotate. Then, the dynamic damper device 1 is disposed with a rotating shaft which is rotated by being transmitted with a power from the engine 4 in the power train 3, here, with the output shaft 10 of the drive system 6.

As illustrated in FIG. 2, since a damper mass vibrates in an inverted phase to vibration of a specific frequency, which acts on the dynamic damper device 1 from the output shaft 10 via springs 31 as elastic members, the dynamic damper device 1 damps (absorbs) and suppresses the vibration. That is, the dynamic damper device 1 can achieve a high vibration damping effect (dynamic damper effect) by that the damper mass resonantly vibrates to the vibration of the specific frequency acting on the dynamic damper device 1 and alternatively absorbs vibration energy and absorbs the vibration.

Then, the dynamic damper device 1 more appropriately reduces the vibration by being provided with a planetary gear mechanism 20, a spring holding mechanism 30 for holding the springs 31, and a rotation control device 40. The dynamic damper device 1 is disposed so that the output shaft 10 is inserted inside of the planetary gear mechanism 20, the spring holding mechanism 30, the rotation control device 40, and the like. Here, the ECU 8 is used also as a control device of the rotation control device 40. Note that predetermined positions of the output shaft 10, the planetary gear mechanism 20, and the like described above are supported by a case via bearings and the like.

In the planetary gear mechanism 20 of the dynamic damper device 1 of the embodiment, one or more of plural rotation elements of the planetary gear mechanism 20 are used as rotation control elements as well as one another rotation element is used as a torque applying element (in other words, a reaction force applying element). In the dynamic damper device 1, the torque applying element of the plural rotation elements of the planetary gear mechanism 20 is used as an input element to which a power from the engine 4 is input.

Further, in the dynamic damper device 1, since the planetary gear mechanism 20 is coupled with and elastically supported by the output shaft 10 via the springs 31, the respective rotation elements act as an inertia mass member for generating inertia moment in the damper mass, that is, in the dynamic damper, and the springs 31 act as members for adjusting twist rigidity of the dynamic damper. Note that, in the following explanation, when the inertia mass of the damper mass is made variable, it is assumed that this includes a case that an apparent inertia mass is made variable by making a rotation of the damper mass variable unless otherwise particularly noted.

Specifically, the planetary gear mechanism 20 is configured including plural rotation elements which can differentially rotate each other and rotation centers of the rotation elements are disposed coaxially with the rotation axis line X. The planetary gear mechanism 20 is a so-called single pinion type planetary gear mechanism and is configured including, as rotation elements, a sun gear 20S which is an outer tooth gear, a ring gear 20R which is an inner tooth gear disposed coaxially with the sun gear 20S, and a carrier 20C for holding plural pinion gears 20P meshed with the sun gear 20S and the ring gear 20R so that the pinion gears 20P can rotate on their axes as well as revolve. In the planetary gear mechanism 20 of the embodiment, the carrier 20C is a first rotation element and is the above input element as well as corresponds to the above torque applying element, and the ring gear 20R and the sun gear 20S are second rotation elements different from the first rotation element and correspond to the above rotation control element.

The carrier 20C is formed in an annular sheet shape and supports the pinion gears 20P which are outer tooth gears to a pinion shaft 20Ps so that the pinion gears 20P rotate on their axes as well as revolve. The carrier 20C is configured including first side plates 33 and second side plates 34. The first side plates 33 and the second side plates 34 configure the carrier 20C as well as are used also as hold members for holding the springs 31 of the spring holding mechanism 30 which will be described later. The carrier 20C constitutes an input member of the planetary gear mechanism 20. The carrier 20C is relatively rotatably coupled with the output shaft 10 via the springs 31 and the like of the spring holding mechanism 30. A power transmitted from the engine 4 to the output shaft 10 is transmitted (input) to the carrier 20C via the spring holding mechanism 30. Further, the carrier 20C is coupled with a torque control device 40t of the rotation control device 40 which will be described later. The ring gear 20R is formed in an annular sheet shape and a gear is formed on an inner peripheral surface thereof. The ring gear 20R is coupled with a ring gear speed control device 40Rs of the rotation control device 40 which will be described later. The sun gear 20S is formed in an annular sheet shape, and a gear is formed on an outer peripheral surface. The sun gear 20S is coupled with a sun gear speed control device 40Ss of the rotation control device 40 which will be described later.

The spring holding mechanism 30 includes the springs 31 and a center plate 32, the first side plates 33 and the second side plates 34 as the hold member for holding the springs 31, and center axis lines are disposed coaxially with the rotation axis line X. The springs 31 elastically supports the carrier 20C which is the input element of the planetary gear mechanism 20 to the output shaft 10, and plural springs are held along the circumferential direction by the center plate 32, the first side plates 33 and the second side plates 34. The springs 31 couple the output shaft 10 with the carrier 20C so that the output shaft 10 can relatively rotate with the carrier 20C. That is, in the dynamic damper device 1, the springs 31 are interposed between the output shaft 10 and the planetary gear mechanism 20.

The center plate 32, the first side plates 33 and the second side plates 34 hold the springs 31 so as to be able to mutually transmit a power and are formed in an annular sheet shape coaxially with the rotation axis line X, respectively. The center plate 32 is supported on an outer peripheral surface of the output shaft 10, and a radial direction inside end is couple with the output shaft 10 via a spline engaging section and the like so as to be able to rotate integrally with the output shaft 10. The first side plates 33 and the second side plates 34 are disposed on both the sides of the center plate 32 in the axial direction, respectively and used also as the carrier 20C as described above. The first side plates 33 and the second side plates 34 are disposed so as to be able to relatively rotate with respect to the center plate 32 in a state that they are integrated across the center plate 32 via pins, spacers, and the like. Then, the first side plates 33 and the second side plates 34 are fixed with one end side of the pinion shaft 20Ps. The pinion shaft 20Ps passes through the center plate 32 so as to be able to allow a relative rotation with the first side plates 33, the second side plates 34, and the center plate 32, and the pinion gears 20P are supported to the other end side so as to rotate on their axes. Then, the springs 31 are held between the center plate 32 and the first side plates 33, and the second side plates 34 in a rotating direction (circumferential direction).

In the spring holding mechanism 30 configured as described above, the springs 31 are interposed between the center plate 32 rotated integrally with the output shaft 10, and the first side plates 33 and the second side plates 34 used also as the carrier 20C with respect to the rotating direction (circumferential direction). As a result, the spring holding mechanism 30 can relatively rotatably couple the output shaft 10 with the carrier 20C via the springs 31 and the like. The power (variation component) transmitted from the engine 4 to the output shaft 10 is input (transmitted) to the first side plates 33 and the second side plates 34 used also as the carrier 20C via the center plate 32 and the springs 31. During the period, the respective springs 31 are elastically deformed in response to a magnitude of the transmitted power while held between the center plate 32 and the first side plates 33, the second side plates 34 with respect to the rotating direction.

The rotation control device 40 controls a rotation of the planetary gear mechanism 20 by adjusting torque acting on the planetary gear mechanism 20. The rotation control device 40 includes the ring gear speed control device 40Rs and the sun gear speed control device 40Ss as a speed control device and the torque control device 40t. The ring gear speed control device 40Rs is coupled with the ring gear 20R and controls a rotation speed of the ring gear 20R. The sun gear speed control device 40Ss is coupled with the sun gear 20S and controls a rotation speed of the sun gear 20S. The torque control device 40t is coupled with the carrier 20C and controls torque acting on the carrier 20C. With the operation, the rotation control device 40 controls the rotation of the planetary gear mechanism by adjusting torque acting on the planetary gear mechanism 20.

The ring gear speed control device 40Rs of the embodiment is configured including a brake device or a rotary electric machine coupled with the ring gear 20R, here, an electromagnetic brake 41Rs as the brake device. The sun gear speed control device 40Ss is configured including a brake device or a rotary electric machine coupled with the sun gear 20S, here, an electromagnetic brake 41Ss as the brake device. The torque control device 40t is configured including a brake device or a rotary electric machine coupled with the carrier 20C, here, an electromagnetic brake 41t as the brake device. The electromagnetic brake 41Rs selectively couples the ring gear 20R with a fixed section, for example, a case. The electromagnetic brake 41Ss selectively couples the sun gear 20S with a fixed section, for example, a case. The electromagnetic brake 41t selectively couples the carrier 20C with a fixed section, for example, a case.

Specifically, the electromagnetic brakes 41Rs, 41Ss, 41t are configured including electromagnetic coils 42Rs, 42Ss, 42t, rotation members 43Rs, 43Ss, 43t, and push pistons 44Rs, 44Ss, 44t, respectively. The electromagnetic brake 41Rs can brake the rotation member 43Rs which is rotated integrally with the ring gear 20R at a predetermined brake torque (braking torque) as well as can adjust a magnitude of the brake torque. The electromagnetic brake 41Ss can brake the rotation member 43Ss which is rotated integrally with the sun gear 20S at a predetermined brake torque (braking torque) as well as can adjust a magnitude of the brake torque. The electromagnetic brake 41t can brake the rotation member 43t which is rotated integrally with the carrier 20C at a predetermined brake torque (braking torque) as well as can adjust a magnitude of the brake torque.

The electromagnetic coils 42Rs, 42Ss, 42t generate electromagnetic forces by being supplied with a current. The rotation members 43Rs, 43Ss, 43t are formed in an annular sheet shape coaxially with the rotation axis line X. The rotation member 43Rs is supported on an outer peripheral surface of an extending section 20Ra of the ring gear 20R, and a radial direction inside end is coupled with the ring gear 20R so as to be able to rotate integrally therewith via a spline engaging section and the like. The rotation member 43Ss is supported on an outer peripheral surface of an extending section 20Sa of the sun gear 20S, and a radial direction inside end is coupled with the sun gear 20S so as to be able to rotate integrally therewith via a spline engaging section and the like. The rotation member 43t is supported on an outer peripheral surface of an extending section 20Ca of the carrier 20C, and the radial direction inside end is coupled with the carrier 20C so as to be able to rotate integrally therewith via a spline engaging section and the like.

The electromagnetic coils 42Rs, 42Ss, 42t are disposed at positions confronting in the axial direction with respect to radial direction outside ends of the corresponding rotation members 43Rs, 43Ss, 43t, respectively and fixed to cases and the like. The push pistons 44Rs, 44Ss, 44t are formed in an annular sheet shape coaxially with the rotation axis line X. The push pistons 44Rs, 44Ss, 44t are supported to cases and the like on one sides (input sides) of the corresponding rotation members 43Rs, 43Ss, 43t in the axial direction, respectively. Radial direction outside ends of the push pistons 44Rs, 44Ss, 44t are supported so as to be able to relatively move along the axial direction via spline engaging sections and the like. Here, drives of the electromagnetic brakes 41Rs, 41Ss, 41t are controlled by the ECU 8.

When a current is supplied to the electromagnetic coils 42Rs, 42Ss, 42t, the push pistons 44Rs, 44Ss, 44t are attracted to the rotation members 43Rs, 43Ss, 43t side along the axial direction by electromagnetic forces of the electromagnetic coils 42Rs, 42Ss, 42t and the electromagnetic brakes 41Rs, 41Ss, 41t press the rotation members 43Rs, 43Ss, 43t along the axial direction. Then, the electromagnetic brakes 41Rs, 41Ss, 41t frictionally brake rotations of the rotation members 43Rs, 43Ss, 43t by friction forces generated to contact surfaces in contact with abutment surfaces in the vicinity of the rotation members 43Rs, 43Ss, 43t and the push pistons 44Rs, 44Ss, 44t, the electromagnetic coils 42Rs, 42Ss, 42t.

At the time, since the current supplied to the electromagnetic coils 42Rs, 42Ss, 42t is adjusted by the ECU 8, the electromagnetic brakes 41Rs, 41Ss, 41t adjust a magnitude of brake torque (braking torque) for braking rotations of the rotation members 43Rs, 43Ss, 43t. Typically, in the electromagnetic brakes 41Rs, 41Ss, 41t, press forces by the push pistons 44Rs, 44Ss, 44t are increased as the current supplied to the electromagnetic coils 42Rs, 42Ss, 42t increases so that brake torque becomes large. When brake torque is 0 (when a supply current is 0), the electromagnetic brakes 41Rs, 41Ss, 41t are placed in a perfectly released state in which the rotation members 43Rs, 43Ss, 43t are perfectly released, and as the brake torque (supply current) becomes larger, they are placed in a perfectly engaged state via a semi-engaged state (slip state).

Here, the ECU 8 controls drives of respective sections of the vehicle 2 and is an electronic circuit mainly composed of a known microcomputer including a CPU, ROM, RAM, and an interface. The ECU 8 controls the engine 4, the drive system 6, and the like as well as controls drives of the ring gear speed control device 40Rs, the sun gear speed control device 40Ss and the torque control device 40t, here the electromagnetic brakes 41Rs, 41Ss, 41t of the rotation control device 40.

The dynamic damper device 1 configured as described above cancels, damps (absorbs), and suppresses vibration of a specific frequency acting on the planetary gear mechanism 20 as the damper mass from the output shaft 10 via the spring 31 by that the damper mass vibrates in an inverted phase. Accordingly, the dynamic damper device 1 can suppress vibration caused by, for example, a first engine explosion generated in the power train 3 and thus can reduce vibration noise and improve fuel consumption.

At the time, since the ECU 8 executes a vibration damping control by controlling drives of the ring gear speed control device 40Rs, the sun gear speed control device 40Ss and the torque control device 40t, here, drives of the electromagnetic brakes 41Rs, 41Ss, 41t and controls the rotation of the planetary gear mechanism 20, the dynamic damper device 1 can appropriately set the vibration of the inverted phase in the dynamic damper device 1 in response to vibration generated in the power train 3 so that vibration can be appropriately reduced in a wide operation region.

That is, in the dynamic damper device 1, the ECU 8 controls drives of the electromagnetic brakes 41Rs, 41Ss, 41t to thereby variably control the rotation of the planetary gear mechanism 20. With the operation, the dynamic damper device 1 executes an inertia mass control for controlling an apparent inertia mass of the damper mass variable by making rotations of the ring gear 20R and the sun gear 20S of the planetary gear mechanism 20 variable and making an inertia force acting on the damper mass including the ring gear 20R, the sun gear 20S and the like variable. For example, since the dynamic damper device 1 increases the apparent inertia mass of the damper mass by increasing a rotation speed of the ring gear 20R which is a relatively large damper mass so that an effect similar to a case that an actual inertia mass is increased can be obtained.

More specifically, the ECU 8 of the embodiment executes the vibration damping control by controlling the rotation of the planetary gear mechanism 20 by adjusting torque acting on the carrier 20C which is the input element of the planetary gear mechanism 20 by controlling drives of the electromagnetic brake 41Rs which is the ring gear speed control device 40Rs, the electromagnetic brake 41Ss which is the sun gear speed control device 40Ss, and the electromagnetic brake 41t which is the torque control device 40t and executing a speed control by the ring gear speed control device 40Rs or the sun gear speed control device 40Ss and executing a torque control by the torque control device 40t. With the operation, when the dynamic damper device 1 executes the vibration damping control, since the dynamic damper device 1 can execute a vibration damping control having a high responsiveness as explained below, the dynamic damper device 1 can execute the control so that, for example, an efficiency of the power train 3 and the vibration noise are optimized.

Here, the carrier 20C, the ring gear 20R, the sun gear 20S of the planetary gear mechanism 20 operate at a rotation speed (corresponding to a rotation number) based on an alignment chart shown in FIG. 3. FIG. 3 is a speed graph showing the relative relation among rotation speeds (rotation number) of the respective rotation elements of the planetary gear mechanism 20 by straight lines, in which a vertical axis shows the speed ratio (corresponding to a relative rotation number ratio) of respective rotations of the sun gear 20S, the carrier 20C, and the ring gear 20R, and speed ratios of the respective rotation elements are disposed, respectively so that intervals of the respective rotation elements along a horizontal axis become intervals in response to a tooth number ratios of the ring gear 20R and the sun gear 20S. Here, in FIG. 3, the carrier 20C which is the input element is used as a reference, and the speed ratio of a rotation of the carrier 20C is set to 1. Further, a gear ratio ρ shown in FIG. 3 is a gear ratio of the planetary gear mechanism 20. That is, when an interval between the sun gear 20S and the carrier 20C is set to "1", an interval between the carrier 20C and the ring gear 20R corresponds to the gear ratio ρ.

Then, in the overall planetary gear mechanism 20, when the apparent inertia mass (hereinafter, unless otherwise particularly noted, called "inertia mass speed term") by making rotation speeds of the respective rotation elements variable is shown by an overall inertia mass speed term $I_0$, the overall inertia mass speed term $I_0$ can be expressed by the following expression (1) using an inertia mass speed term $Is_0$ of the sun gear 20S, an inertia mass speed term $Ic_0$ of the carrier 20C, and an inertia mass speed term $Ir_0$ of the ring gear 20R. In other words, the overall inertia mass speed term $I_0$ is the apparent inertia mass in the overall planetary gear mechanism 20 by a rotation speed control.

$$I_0 = Is_0 + Ic_0 + Ir_0 \quad (1)$$

The inertia mass speed term $Is_0$ of the sun gear 20S, the inertia mass speed term $Ic_0$ of the carrier 20C, and the inertia mass speed term $Ir_0$ of the ring gear 20R can be expressed by the following expressions (2) to (4) using an inertia mass Is of the sun gear 20S, an inertia mass Ic of the carrier 20C, and an inertia mass Ir of the ring gear 20R when, for example, the speed ratio is 1.

$$Is_0 = \delta^2 \cdot Is \quad (2)$$

$$Ic_0 = Ic \quad (3)$$

$$Ir_0 = (1 + (1-\delta) \cdot \rho)^2 \cdot Ir \quad (4)$$

Accordingly, the overall inertia mass speed term $I_0$ can be expressed by the following expression (5) based on the expressions (1) to (4).

$$I_0 = \delta^2 \cdot Is + Ic + (1 + (1-\delta) \cdot \rho)^2 \cdot Ir \quad (5)$$

Then, in the overall planetary gear mechanism 20, when an apparent inertia mass (hereinafter, unless otherwise particularly noted, called "inertia mass torque term") by torque acting when the rotation speeds of the respective rotation elements change is shown by an overall inertia mass torque term It, the overall inertia mass torque term It can be expressed by the following expression (6) using carrier torque (torque acting on the carrier 20C from the planetary gear mechanism 20 main body side) Tc acting on the carrier 20C as the input element when the rotation speeds of the respective rotation elements change and an angular speed change amount dω/dt in the overall planetary gear mechanism 20 by the carrier torque Tc. In other words, the overall inertia mass torque term It is an apparent inertia mass in the overall planetary gear mechanism 20 by the torque control.

$$It = Tc/(d\omega/dt) \quad (6)$$

The carrier torque Tc can be directly controlled by adjusting brake torque Tbt by the electromagnetic brake 41t which is a carrier load control element coupled with the carrier 20C.

Then, in the overall planetary gear mechanism 20, when an apparent inertia mass by making the rotations of the respective rotation elements variable is set as an overall inertia mass (overall inertia mass of the damper mass of the dynamic damper device 1) Ia, the overall inertia mass Ia can be expressed by the following expression (7) using the overall inertia mass speed term $I_o$ and the overall inertia mass torque term It.

$$Ia = I_o + It \quad (7)$$

A natural frequency fa as the dynamic damper device 1 at the time can be expressed by the following expression (8) using a spring constant Kd of the spring 31 and the overall inertia mass Ia.

$$fa = (\sqrt{(Kd/Ia)})/2\pi \quad (8)$$

Accordingly, the dynamic damper device 1 can appropriately adjust the natural frequency fa in response to the vibration generated in the power train 3 by adjusting the overall inertia mass Ia. At the time, the dynamic damper device 1 can adjust the overall inertia mass Ia and can adjust the natural frequency fa with a good responsiveness in comparison with, for example, a case that the overall inertia mass speed term $I_o$ is adjusted by adjusting the overall inertia mass torque term It by adjusting the carrier torque Tc and controlling the rotation of the planetary gear mechanism 20. This is because that since the speeds of the respective rotation elements correspond to an integration term of torque, the overall inertia mass torque term It can be more promptly changed than the overall inertia mass speed term $I_o$.

In the dynamic damper device 1 of the embodiment, the brake torque Tbt by the electromagnetic brake 41t is adjusted and the carrier torque Tc is adjusted by that the ECU 8 controls a drive of the electromagnetic brake 41t which is the torque control device 40t of the rotation control device 40 as the torque control in the vibration damping control. With the operation, in the dynamic damper device 1, the overall inertia mass torque term It and the overall inertia mass Ia are adjusted and finally the natural frequency fa is adjusted. As a result, since the dynamic damper device 1 can execute the vibration damping control with a high responsiveness, even when a resonance point (resonance frequency) in the power train 3 abruptly changes in, for example, a gear shift and the like, the dynamic damper device 1 can adjust the resonance frequency to an appropriate natural frequency fa with a good responsiveness to the change so that control can be promptly executed with a good responsiveness so the efficiency and the vibration noise of the power train 3 are optimized. In the vehicle 2, although it is also possible to suppress vibration, by, for example, that a lock-up clutch of a torque converter (not illustrated) is turned OFF (placed is a release state), in the case, there is a possibility that the fuel consumption is deteriorated. However, in the dynamic damper device 1 of the present invention, vibration can be appropriately suppressed in addition to that the deterioration of fuel consumption caused by turning OFF the lock-up clutch is suppressed.

Here, since the ECU 8 executes the vibration damping control by the speed control by the ring gear speed control device 40Rs or the sun gear speed control device 40Ss and the torque control by the torque control device 40t, the dynamic damper device 1 of the embodiment can execute the vibration damping control by appropriately selectively using an inertia mass control by the speed control and an inertia mass control by torque control in response to an operation state, thereby an accuracy of the vibration damping control can be improved. The speed control by the ring gear speed control device 40Rs or the sun gear speed control device 40Ss is control for adjusting the overall inertia mass speed term $I_o$ by controlling the rotation speeds of the respective rotation elements of the planetary gear mechanism 20 and adjusting the overall inertia mass Ia and the natural frequency fa by adding brake torque Tbrs by the electromagnetic brake 41Rs (in other words, ring gear torque Tr acting on the ring gear 20R) or brake torque Tbss by the electromagnetic brake 41Ss (in other words, sun gear torque Ts acting on the sun gear 20S). In the speed control, the ring gear speed control device 40Rs and the sun gear speed control device 40Ss are selectively used depending on a case that the rotation elements are controlled to a speed reduction side and a case that the rotation elements are controlled to a speed increase side. The torque control by the torque control device 40t is control for adjusting the overall inertia mass torque term It by controlling the brake torque Tbt by the electromagnetic brake 41t and adjusting the overall inertia mass Ia and the natural frequency fa.

For example, the dynamic damper device 1 preferably executes the vibration damping control by the speed control of the ring gear speed control device 40Rs or the sun gear speed control device 40Ss when a torque change of the output shaft 10 is less than a predetermined change and executes the vibration damping control by the torque control of the torque control device 40t when the torque change of the output shaft 10 is equal to or more than the predetermined change. The case that the torque change of the output shaft 10 is less than the predetermined change is typically an operation state that the resonance point in the power train 3 does not largely change, for example, a case that the vehicle 2 is in a steady operation state and the like. The case that the torque change of the output shaft 10 is equal to or more than the predetermined change is typically an operation state that the resonance point in the power train 3 largely changes, for example, a case at a transient time at which a gear shift is executed by the drive system 6, and the like. With the operation, the dynamic damper device 1 can improve an accuracy of the vibration damping control as well as can suppress a deterioration of fuel consumption so that the accuracy of the vibration damping control can be improved and the deterioration of fuel consumption can be suppressed at the same time.

That is, in the dynamic damper device 1, when the torque change of the output shaft 10 is less than the predetermined change such as when the vehicle 2 steadily travels and the like, the ECU 8 executes the vibration damping control by the speed control of the ring gear speed control device 40Rs or the sun gear speed control device 40Ss, adjusts the overall inertia mass speed term $I_o$, adjusts the overall inertia mass Ia and the natural frequency fa, and reduces vibration. Here, it is sufficient that the torque applied to the ring gear 20R or the sun gear 20S when the rotation speeds of the rotation elements of the planetary gear mechanism 20 are adjusted is typically a very small amount of torque and may be dramatically small in comparison with torque which is caused to act on the carrier 20C in the torque control. As a result, in an operation state that the torque change of the output shaft 10 is less than the predetermined change and the resonance point does not largely change such as when the vehicle 2 is in the steady operation and the like, the dynamic damper device 1 can execute the vibration damping control by the speed control in which the fuel consumption is less deteriorate so that the deterioration of fuel consumption can be suppressed.

In contrast, in the dynamic damper device 1, when the torque change of the output shaft 10 is equal to or more than the predetermined change such as when the vehicle 2 shifts a gear and when the vehicle 2 is transiently operated, the ECU 8 executes the vibration damping control by the torque control of the torque control device 40t, adjusts the overall inertia mass torque term It, adjusts the overall inertia mass Ia and the natural frequency fa, and reduces vibration. As a result, in a state in which the torque change of the output shaft 10 is equal to or more than the predetermined change and the resonance point is largely changed such as when the vehicle 2 changes a gear and when the vehicle 2 is transiently operated, and the like, the dynamic damper device 1 can execute the vibration damping control by the torque control with the high responsiveness so that the accuracy of the vibration damping control can be improved.

Note that when the dynamic damper device 1 executes the vibration damping control by the torque control, the dynamic damper device 1 may secure responsiveness by the torque control at the beginning of the vibration damping control and thereafter may switch the torque control to the speed control when the vibration damping control is finished. That is, when the vibration damping control is executed, the dynamic damper device 1 may cause the ECU 8 to finally switch the torque control to the speed control via a period in which the torque control and the speed control are overlapped. In the case, since the dynamic damper device 1 can suppress the deterioration of fuel consumption in addition to that the responsiveness of the vibration damping control is secured, the accuracy of the vibration damping control can be improved and the deterioration of fuel consumption can be suppressed at the same time more appropriately.

Next, an example of the control by the ECU will be explained referring to a flowchart of FIG. 4. Note that these control routines are repeatedly executed in a control cycle of several milliseconds to several tens of milliseconds.

First, the ECU 8 obtains engine information such as a number of engine rotations of the engine 4, speed information of the vehicle 2, and the like (ST1).

Next, the ECU 8 determines whether or not the vehicle 2 shifts a gear based on the information obtained at ST1 using various methods (ST2).

When the ECU 8 determines that the vehicle 2 shifts the gear (ST2: Yes), the ECU 8 determines the overall inertia mass torque term It as a target (ST3). In the case, the ECU 8 calculates the overall inertia mass Ia as the target in response to a gear shift stage (gear shift ratio) after the gear shift based on, for example, a control map exemplified in FIG. 5. The control map exemplified in FIG. 5 describes the correspondence relation between respective gear shift stages (1, 2, 3, . . . ) and the overall inertia mass Ia ($Ia_1$, $Ia_2$, $Ia_3$, . . . ) as a target, is previously set based on an actual vehicle evaluation and the like, and stored in a storage unit of the ECU 8. Then, the ECU 8 calculates the overall inertia mass speed term $I_0$ from a rotation number of the carrier 20C estimated from a speed of the vehicle 2 at present, a rotation number of the ring gear 20R at present detected by a sensor, and the like, and calculates the overall inertia mass torque term It as a target from the target overall inertia mass Ia as the target, the overall inertia mass speed term $I_0$ at present, and the like using, for example, the following expression (9).

$$It = Ia - I_0 \quad (9)$$

Then, the ECU 8 actually executes a gear shift by controlling the drive system 6 as well as controls the electromagnetic brake 41*t* of the torque control device 40*t* as the torque control based on the target overall inertia mass torque term It based on the overall inertia mass torque term It as the target so that an actual overall inertia mass torque term It is converged to the target overall inertia mass torque term It as the target. With the operation, the ECU 8 adjusts the carrier torque Tc, converges the overall inertia mass Ia to the overall inertia mass Ia as the target, and adjusts the natural frequency fa to an appropriate natural frequency fa in response to a resonance point after the gear shift (ST4).

Then, the ECU 8 reduces the overall inertia mass torque term It by the torque control of the torque control device 40*t* while keeping the relation of Ia=$I_0$+It, whereas the ECU 8 increases the overall inertia mass speed term $I_0$ by the speed control of the ring gear speed control device 40Rs or the sun gear speed control device 40Ss, finally establishes It=0, $I_0$=Ia (ST5), finishes the present control cycle, and shifts to a next control cycle.

When the ECU 8 determines at ST2 that the vehicle 2 does not execute the gear shift (ST2: No), the ECU 8 shifts to ST5 and executes subsequent processes.

To explain an example referring to FIG. 6, when, for example, the vehicle 2 executes a gear shift from a fifth speed to a sixth speed at a time t1, an inertia mass necessary to antiresonance changes from $Ia_5$ to $Ia_6$ as shown in the control map exemplified in FIG. 5. In the case, the carrier torque Tc necessary to the antiresonance can be expressed by, for example, the following expression (10). The dynamic damper device 1 is placed in an antiresonance state to the vibration generated in the power train 3 and can reduce the vibration by causing the carrier torque Tc calculated by the expression (10) to act on the carrier 20C by the torque control of the torque control device 40*t*. The carrier torque Tc calculated here corresponds to torque for realizing the target overall inertia mass torque term It as the target.

$$Tc = (Ia_6 - Ia_5) \cdot (d\omega/dt) \quad (10)$$

At the time, to establish $I_0$=$Ia_6$, the ECU 8 adjusts the rotation speeds of the rotation elements by applying a brake torque to the ring gear 20R or the sun gear 20S simultaneously with the gear shift by the speed control of the ring gear speed control device 40Rs or the sun gear speed control device 40Ss. Then, the ECU 8 reduces the overall inertia mass torque term It by the torque control of the torque control device 40*t* (a reduction of It term) while keeping the relation of Ia=$I_0$+It, whereas the ECU 8 increases the overall inertia mass speed term $I_0$ by the speed control of the ring gear speed control device 40Rs or the sun gear speed control device 40Ss (an increase of $I_0$ term), finally establishes It=0, $I_0$=Ia at a time t2, and shifts from a transient state to a steady state.

According to the dynamic damper device 1 according to the embodiment explained above, there are provided the planetary gear mechanism 20 including the plural differentially rotatable rotation elements, the springs 31 for coupling the output shaft 10 rotated by being transmitted with a power with the carrier 20C which is a first rotation element of the planetary gear mechanism 20, the ring gear speed control device 40Rs, the sun gear speed control device 40Ss for controlling a rotation speed of the ring gear 20R, the sun gear 20S that are second rotation elements different from the carrier 20C, respectively, and the torque control device 40*t* coupled with the carrier 20C for controlling torque acting on the carrier 20C. Accordingly, the dynamic damper device 1 can improve the responsiveness of the vibration damping control and can appropriately reduce vibration. As a result, the dynamic damper device 1 can reduce so-called NVH (Noise-Vibration-Harshness) and can enlarge, for example, an operation region in which the lock-up clutch of the torque converter can be turned ON (can be placed in an engaged state), thereby fuel consumption can be improved.

Note that although the dynamic damper device 1 explained above has been explained assuming that the dynamic damper device 1 includes the ring gear speed control device 40Rs and the sun gear speed control device 40Ss as a speed control device, the dynamic damper device 1 may include any one of them as explained below in an example.

Further, in the above explanation, although the ring gear speed control device 40Rs, the sun gear speed control device 40Ss, and the torque control device 40*t* have been explained assuming that they are configured including the electromagnetic brake 41Rs, the electromagnetic brake 41Ss, and the electromagnetic brake 41t as the brake device, respectively, they may be configured including motor generators as rotary electric machines coupled with corresponding rotation elements, respectively in place of the electromagnetic brake 41Rs, the electromagnetic brake 41Ss, and the electromagnetic brake 41t as explained below in an example and may be configured including combinations of brake devices and rotary electric machines.

Second Embodiment

Figure 7:
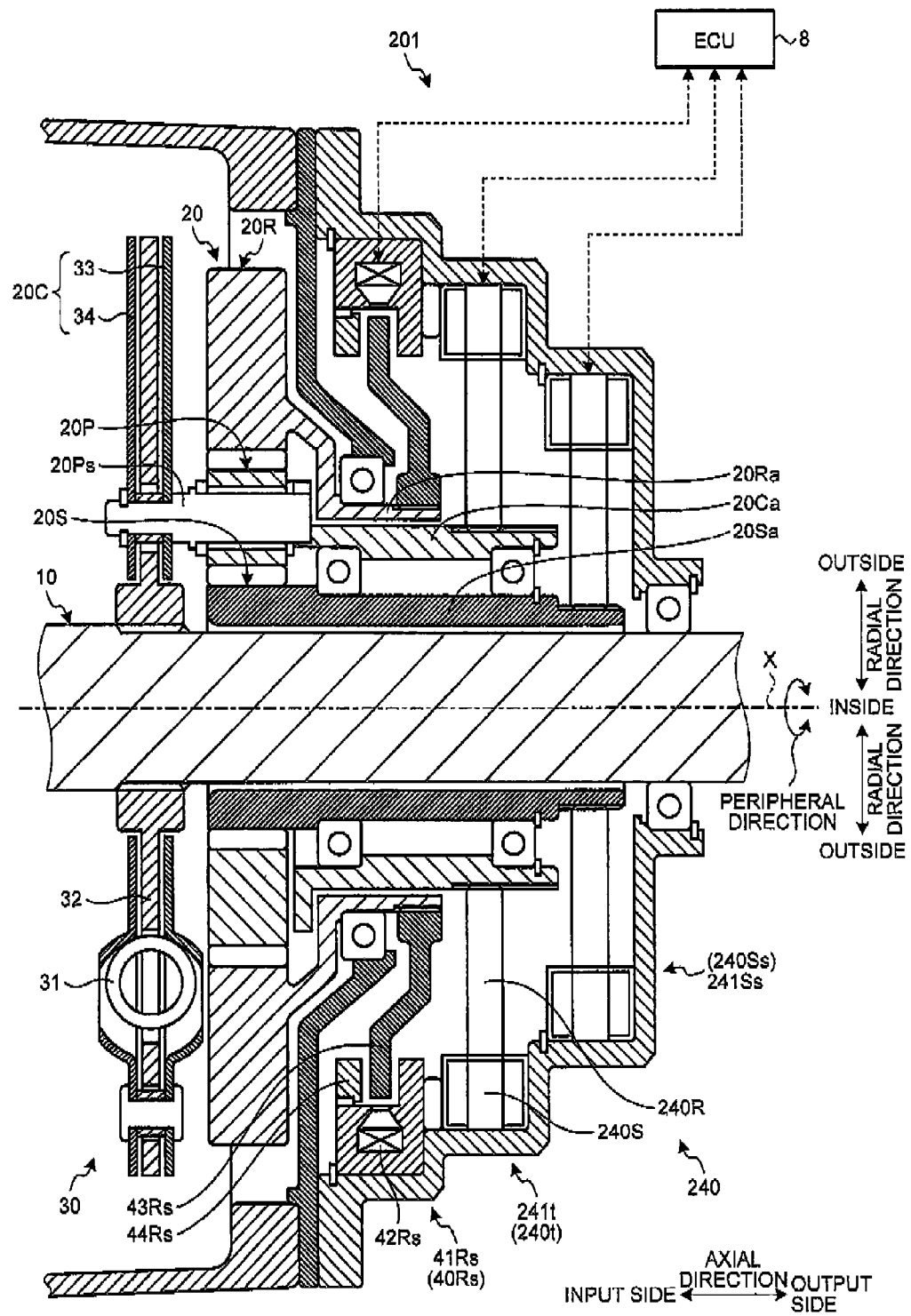
FIG. 7 is a sectional view of a main portion of a dynamic damper device according to a second embodiment.

FIG. 7 is a sectional view of a main portion of a dynamic damper device according to a second embodiment. A configuration of a rotation control device of the dynamic damper device according to the second embodiment is different from the first embodiment. In addition to the above-mentioned, a duplicate explanation as to a configuration, an operation, and an effect which are common to the embodiment described above, will be omitted as much as possible (this is the same as to an embodiment explained below).

A dynamic damper device 201 illustrated in FIG. 7 more appropriately reduces vibration by including a planetary gear mechanism 20, a spring holding mechanism 30 for holding springs 31, and a rotation control device 240. The rotation control device 240 includes a ring gear speed control device 40Rs and a sun gear speed control device 240Ss as a speed control device and a torque control device 240t. Then, the torque control device 240t of the embodiment is configured including a motor 241t as a rotary electric machine coupled with a carrier 20C. The sun gear speed control device 240Ss of the embodiment is configured including a motor 241Ss as a rotary electric machine coupled with a sun gear 20S. Note that since the ring gear speed control device 40Rs has approximately the same configuration as that explained above, an explanation thereof is omitted.

The motor 241t is coupled with the carrier 20C and controls a rotation of the carrier 20C. The motor 241t includes a stator 240S as a stator and a rotor 240R as a rotor. The stator 240S is fixed to a case and the like. The rotor 240R is disposed inside of the stator 240S in a radial direction and coupled with an extending section 20Ca of the carrier 20C so as to be able to rotate integrally therewith. In other words, the extending section 20Ca of the carrier 20C constitutes a rotor shaft with which the rotor 240R is coupled so as to be able to rotate integrally therewith. The motor 241t is a rotary electric machine (motor generator) having both a function as a motor for converting an electric power supplied from a battery via an inverter and the like to a mechanical power and a function as a generator for converting an input mechanical power to an electric power. A configuration of the motor 241Ss is approximately same as the configuration of the motor 241t. The motor 241t can control a rotation of the carrier 20C by that the rotor 240R is driven in rotation. The motor 241Ss can control a rotation of the sun gear 20S. A drive of the motor 241t is controlled by the ECU 8. A drive of the motor 241Ss is controlled by the ECU 8.

The ECU 8 of the embodiment executes a vibration damping control by controlling drives of an electromagnetic brake 41Rs, which is the ring gear speed control device 40Rs, a motor 241Ss, which is the sun gear speed control device 240Ss, and a motor 241t, which is the torque control device 240t, and controlling a rotation of the planetary gear mechanism 20 by adjusting torque acting on the carrier 20C which is an input element of the planetary gear mechanism 20 by a speed control by the ring gear speed control device 40Rs or the sun gear speed control device 240Ss and a torque control by the torque control device 240t. That is, in the dynamic damper device 201, motor torque Tm of the motor 241t is adjusted and carrier torque Tc is adjusted by that the ECU 8 controls a drive of the motor 241t which is the torque control device 240t of the rotation control device 240 as the torque control in the vibration damping control. Here, the torque control by the torque control device 240t is control for adjusting an overall inertia mass torque term It by controlling the motor torque Tm of the motor 241t and adjusting an overall inertia mass Ia and an natural frequency fa. With the operation, in the dynamic damper device 1, the overall inertia mass torque term It and the overall inertia mass Ia are adjusted and finally the natural frequency fa is adjusted. As a result, when the vibration damping control is executed, since the dynamic damper device 201 can execute the vibration damping control with a high responsiveness, the dynamic damper device 201 can execute the control with a good responsiveness so that, for example, an efficiency and vibration noise of a power train 3 is optimized.

According to the dynamic damper device 201 explained above, a responsiveness of the vibration damping control can be improved and vibration can be appropriately reduced. Then, the dynamic damper device 201 can finally adjust the natural frequency fa by controlling the drive of the motor 241t and adjusting torque acting on the carrier 20C. At the time, in the dynamic damper device 201, the motor 241t can also collect energy by power regeneration, thereby a further improvement of fuel consumption and the like can be realized.

Third Embodiment

Figure 8:
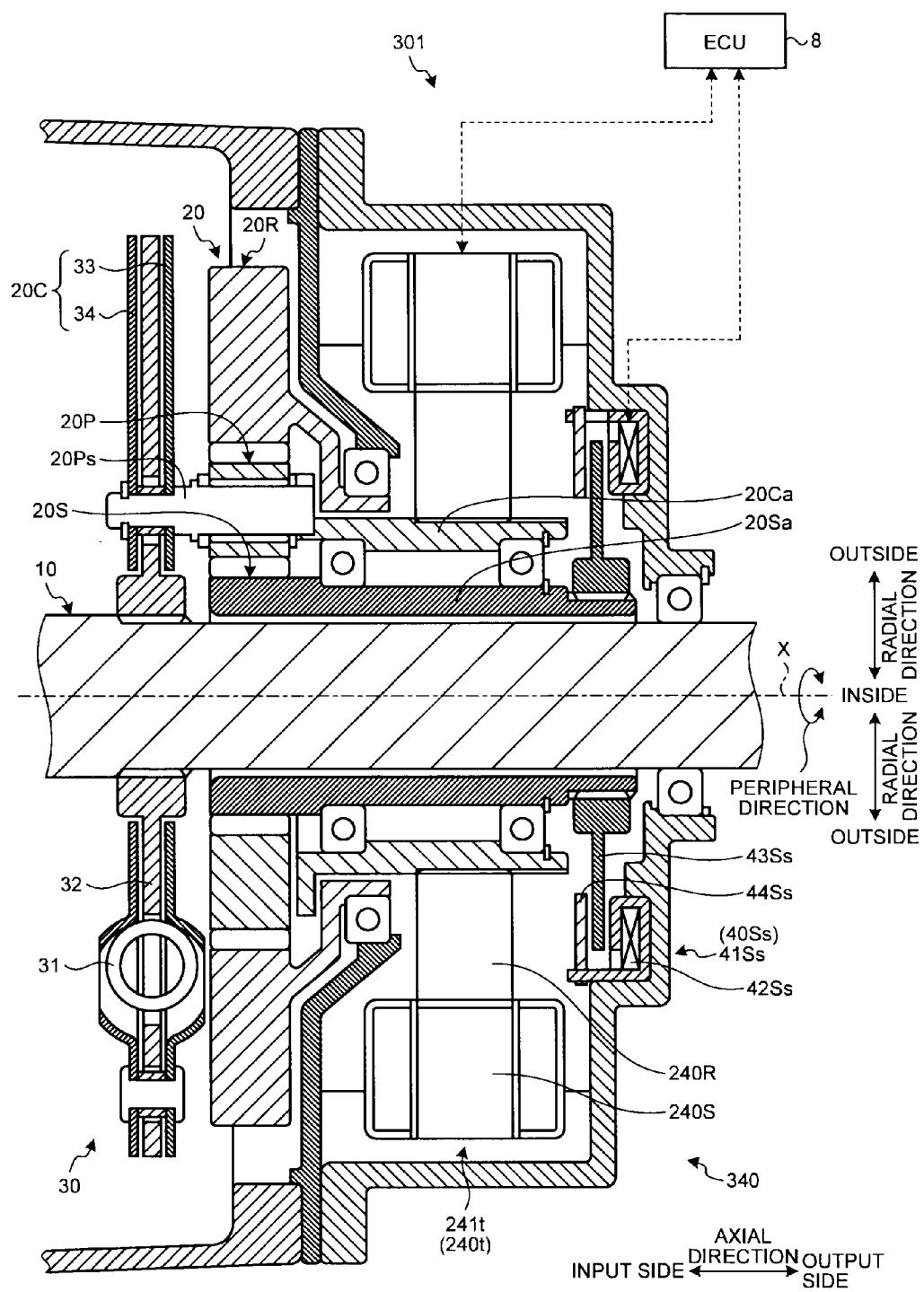
FIG. 8 is a sectional view of a main portion of a dynamic damper device according to a third embodiment.

FIG. 8 is a sectional view of a main portion of a dynamic damper device according to a third embodiment. A configuration of a rotation control device of the dynamic damper device according to the third embodiment is different from the second embodiment.

A dynamic damper device 301 illustrated in FIG. 8 more appropriately reduces vibration by including a planetary gear mechanism 20, a spring holding mechanism 30 for holding springs 31, and a rotation control device 340. The rotation control device 340 includes a sun gear speed control device 40Ss as a speed control device and a torque control device 240t. The torque control device 240t is configured including a motor 241t as a rotary electric machine coupled with a carrier 20C. Note that since the sun gear speed control device 40Ss basically has approximately the same configuration as that explained above although its type is somewhat different, an explanation thereof is omitted.

The dynamic damper device 301 of the embodiment does not include the ring gear speed control device 40Rs described above (refer to FIG. 7) as a speed control device. The dynamic damper device 301 disposes the sun gear speed control device 40Ss as a speed control device to a sun gear 20S which has a tendency that a friction is relatively small as compared with a ring gear 20R in the ring gear 20R and the sun gear 20S which are rotating elements different from the carrier 20C as a first rotating element, and the ring gear 20R is provided with no speed control device.

According to the dynamic damper device 301 according to the embodiment explained above, a responsiveness of the vibration damping control can be improved and vibration can be appropriately reduced. Then, since the ring gear 20R is not provided with an electromagnetic brake 41Rs (refer to FIG. 7) which is the ring gear speed control device 40Rs, the dynamic damper device 301 can suppress a dragging loss in comparison with, for example, a dynamic damper device 201 (refer to FIG. 7). Further, since the ring gear 20R is not provided with the electromagnetic brake 41Rs, the dynamic damper device 301 can secure a relatively large installation space of the motor 241t in addition to that an increase of size of an overall device is suppressed in comparison with, for example, the dynamic damper device 201, thereby a size of the motor 241*t* can be increased. With the configuration, the dynamic damper device 301 can improve an efficiency and an output of the motor 241*t* in addition to that the increase of size of the overall device is suppressed, carrier torque Tc can be more appropriately adjusted. As a result, the dynamic damper device 301 can realize a further improvement of fuel consumption, and the like.

Note that the dynamic damper devices according to the embodiments of the present invention described above are not limited to the embodiments described above and can be variously modified within a scope described in claims. The dynamic damper device according to the embodiment may be configured by combining plural embodiments explained above.

Although the above explanation has been made assuming that the ECU 8 is used also as the control device of the speed control device and the control device of the torque control device, control devices may be individually provided, respectively and the respective control devices may be configured to deliver information such as detected signals, drive signals, control commands, and the like between them and the ECU 8 each other.

In the above explanation, the planetary gear mechanism has been explained in, for example, the first embodiment and the like assuming that the carrier is the first rotating element and the ring gear and the sun gear are the second rotating elements, the planetary gear mechanism is not limited thereto. In the planetary gear mechanism, for example, the ring gear may be the first rotating element and the sun gear may be the first rotating element.

In the above explanation, although the dynamic damper device has been explained assuming that the dynamic damper device is disposed to the output shaft 10 in the power train as a rotating shaft rotated by being transmitted with a power from the internal combustion engine, the dynamic damper device is not limited thereto. The dynamic damper device may be disposed to a rotating shaft (speed increasing shaft) which is rotated integrally with the output shaft 10 via, for example, a drive gears, a driven gears and the like.

Industrial Applicability

As described above, the dynamic damper device according to the present invention is preferably applied to a dynamic damper device mounted in various vehicles.

Reference Signs List

1, 201, 301 DYNAMIC DAMPER DEVICE
2 VEHICLE
3 POWER TRAIN
4 ENGINE (INTERNAL COMBUSTION ENGINE)
8 ECU
10 OUTPUT SHAFT (ROTATING SHAFT)
20 PLANETARY GEAR MECHANISM
20C CARRIER
20S SUN GEAR
20R RING GEAR
30 SPRING HOLDING MECHANISM
31 SPRING (ELASTIC MEMBER)
40, 240, 340 ROTATION CONTROL DEVICE
40Ss SUN GEAR SPEED CONTROL DEVICE (SPEED CONTROL DEVICE)
40*t*, 240*t* TORQUE CONTROL DEVICE
40Rs RING GEAR SPEED CONTROL DEVICE (SPEED CONTROL DEVICE)
41Rs, 41Ss, 41*t* ELECTROMAGNETIC BRAKE (BRAKE DEVICE)
241*t* MOTOR (ROTARY ELECTRIC MACHINE)

The invention claimed is:

1. A dynamic damper device comprising:
a planetary gear mechanism including a plurality of differentially rotatable rotating elements that are each selectively engaged with a case;
an elastic member that couples a rotating shaft rotated by being transmitted with a power with a first rotating element of the planetary gear mechanism;
a speed control device that is coupled with second rotating elements different from the first rotating element and control rotation speeds of the second rotating elements; and
a torque control device that is coupled with the first rotating element and controls torque acting on the first rotating element,
wherein at least one of the second rotating elements includes a damper mass configured to suppress vibration of a specific frequency acting on the planetary gear mechanism.

2. The dynamic damper device according to claim 1, wherein a vibration damping control is executed by a speed control by the speed control device and a torque control by the torque control device.

3. The dynamic damper device according to claim 1, wherein when a torque change of the rotating shaft is less than a predetermined change, a vibration damping control is executed by a speed control of the speed control device, and when the torque change of the rotating shaft is equal to or more than the predetermined change, the vibration damping control is executed by a torque control of the torque control device.

4. The dynamic damper device according to claim 1, wherein when a vibration damping control is executed, a torque control of the torque control device is switched to a speed control of the speed control device via a period in which the torque control is overlapped with the speed control.

5. The dynamic damper device according to claim 1, wherein the torque control device is configured to include a brake device or a rotary electric machine coupled with the first rotating element.

6. The dynamic damper device according to claim 1, wherein the speed control device is configured to include a brake device or a rotary electric machine coupled with the second rotating elements.

7. The dynamic damper device according to claim 1, wherein the rotating shaft is rotated by being transmitted with the power from an internal combustion engine.

8. The dynamic damper device according to claim 2, wherein when a torque change of the rotating shaft is less than a predetermined change, the vibration damping control is executed by the speed control, and when the torque change of the rotating shaft is equal to or more than the predetermined change, the vibration damping control is executed by the torque control.

9. The dynamic damper device according to claim 2, wherein when the vibration damping control is executed, the torque control is switched to the speed control via a period in which the torque control is overlapped with the speed control of the speed control device.

10. The dynamic damper device according to claim 3, wherein when the vibration damping control is executed, the torque control is switched to the speed control via a period in which the torque control is overlapped with the speed control of the speed control device.

11. The dynamic damper device according to claim 2, wherein the torque control device is configured to include a brake device or a rotary electric machine coupled with the first rotating element.

12. The dynamic damper device according to claim 3, wherein the torque control device is configured to include a brake device or a rotary electric machine coupled with the first rotating element.

13. The dynamic damper device according to claim 4, wherein the torque control device is configured to include a brake device or a rotary electric machine coupled with the first rotating element.

14. The dynamic damper device according to claim 2, wherein the speed control device is configured to include a brake device or a rotary electric machine coupled with the second rotating elements.

15. The dynamic damper device according to claim 3, wherein the speed control device is configured to include a brake device or a rotary electric machine coupled with the second rotating elements.

16. The dynamic damper device according to claim 4, wherein the speed control device is configured to include a brake device or a rotary electric machine coupled with the second rotating elements.

17. The dynamic damper device according to claim 5, wherein the speed control device is configured to include a brake device or a rotary electric machine coupled with the second rotating elements.

18. The dynamic damper device according to claim 2, wherein the rotating shaft is rotated by being transmitted with the power from an internal combustion engine.

19. The dynamic damper device according to claim 3, wherein the rotating shaft is rotated by being transmitted with the power from an internal combustion engine.

20. The dynamic damper device according to claim 4, wherein the rotating shaft is rotated by being transmitted with the power from an internal combustion engine.

* * * * *